(12) United States Patent
Tang

(10) Patent No.: US 6,916,353 B2
(45) Date of Patent: Jul. 12, 2005

(54) CURVED SIDE OIL OR FLUID SEPARATOR ELEMENT

(75) Inventor: Yan Tang, Daphne, AL (US)

(73) Assignee: Coltec Industries Inc., Charlotte, NC (US)

( * ) Notice: Subject to any disclaimer, the term of this patent is extended or adjusted under 35 U.S.C. 154(b) by 0 days.

(21) Appl. No.: 10/815,365

(22) Filed: Apr. 1, 2004

(65) Prior Publication Data

US 2004/0194439 A1 Oct. 7, 2004

Related U.S. Application Data

(60) Provisional application No. 60/459,457, filed on Apr. 1, 2003.

(51) Int. Cl.[7] ............................................. B01D 46/02
(52) U.S. Cl. ...................... 55/495; 55/385.1; 55/385.3; 55/482; 55/484; 55/497; 55/498; 55/500; 55/503; 55/510; 55/521; 55/529; 55/DIG. 17; 55/DIG. 28; 123/198 E
(58) Field of Search ............................ 55/385.1, 385.2, 55/385.3, 385.4, 482, 484, 495, 497, 498, 500, 502, 503, 510, 511, 521, 529, DIG. 17, DIG. 28; 210/435, 448, 452, 493.1, 497.01, 497.3; 123/198 E

(56) References Cited

U.S. PATENT DOCUMENTS

| | | | | |
|---|---|---|---|---|
| 2,799,357 A | * | 7/1957 | Warnecke et al. | ............ 55/529 |
| 3,457,917 A | * | 7/1969 | Mercurio | ..................... 55/529 |
| 4,039,308 A | * | 8/1977 | Schiff | ........................... 55/529 |
| 4,343,149 A | * | 8/1982 | Abthoff et al. | ............... 55/529 |
| 4,595,401 A | * | 6/1986 | Witchell | ....................... 55/503 |
| 4,699,715 A | * | 10/1987 | Lee, II | ......................... 55/521 |
| 4,802,902 A | * | 2/1989 | Bauerle et al. | ............... 55/484 |
| 5,269,824 A | * | 12/1993 | Takita | ....................... 55/385.1 |
| 5,685,887 A | * | 11/1997 | Mochida | ...................... 55/510 |
| 5,750,024 A | | 5/1998 | Spearman | |
| 5,916,435 A | | 6/1999 | Spearman et al. | |
| 5,958,096 A | * | 9/1999 | Yee et al. | ...................... 55/529 |
| 6,312,489 B1 | * | 11/2001 | Ernst et al. | .................. 55/529 |
| 6,808,552 B2 | * | 10/2004 | Borla | .......................... 55/497 |
| 2004/0103626 A1 | * | 6/2004 | Warth et al. | .................. 55/498 |

* cited by examiner

Primary Examiner—Duane Smith
Assistant Examiner—Jason M. Greene
(74) Attorney, Agent, or Firm—John M. Harrington; Kilpatrick Stockton LLP

(57) ABSTRACT

A curved side oil or fluid separator element for separating liquid or oil from a gas flow has a body portion made of filter media with opposing upper and lower ends. A curved side extends between the upper and lower ends and rotates 360° about a central axis of the body portion to form a curved surface of the body portion. The curved side of the body portion can be any one of a hyperbolically curved side, a circular arc curved side, an elliptically curved side, or any other curve except a straight line, and any combinations of these curves. In one aspect, the curved side of the body portion is adapted for in-out gas flow allowing the gas flow to exit through the curved side to a communicating outlet of a separator housing. In another aspect, the curved side of the body portion is adapted for out-in gas flow for receiving the gas flow through the curved side from a communicating inlet of the separator housing.

15 Claims, 4 Drawing Sheets

CURVED SIDE OIL OR FLUID SEPARATOR ELEMENT

PRIORITY APPLICATION

This application claims the benefit of U.S. Provisional Application No. 60/459,457 filed Apr. 1, 2003, entitled "Curved Side Oil or Fluid Separator Element" incorporated herein by this reference.

FIELD OF THE INVENTION

The present invention relates generally to the field of oil and fluid separator elements, and more particularly to an oil or fluid separator element having a curved side, such as hyperbola, part of a circular arc, part of an ellipse or the like, for separating liquid or oil from a gas flow.

BACKGROUND OF THE INVENTION

Separator elements for use in separating liquid droplets from gases or other liquids are known from the existing art. For example, U.S. Pat. No. 5,750,024 of Spearman proposed a coalescing filter element for separating liquid droplets from gases or other liquids which has a conical configuration. According to Spearman, one or more of the porous coalescing conical filter elements is disposed within a cylindrical filter housing with the smallest end of each conical filter pointed in the direction of flow with the flow proceeding in-out, such that the area between the element and the wall increases in the direction of fluid flow to keep the annular velocity of fluid flow substantially constant or decreasing.

SUMMARY OF THE INVENTION

It is a feature and advantage of the present invention to provide an oil or fluid separator element for separating liquid or oil from a gas flow having a curved side such as hyperbola, part of a circular arc, part of an ellipse or the like.

It is a another feature and advantage of the present invention to provide an oil or fluid separator element having a curved side for separating liquid or oil from either an in-out or an out-in flow of a gas such as air, refrigerant or any other gas.

It is an additional feature and advantage of the present invention to provide an oil or fluid separator element having a curved side for separating liquid or oil from a gas flow that maximizes the surface area for a given amount of media material and in turn minimizes the velocity and maximizes the separation efficiency.

It is a further feature and advantage of the present invention to provide an oil or fluid separator element for separating liquid or oil from a gas flow having a curved side for separating liquid or oil from a gas flow in which the smooth nozzle-like configuration of the element improves flow distribution.

It is still another feature and advantage of the present invention to provide an oil or fluid separator element for separating liquid or oil from a gas flow having a curved side in which the cross-sectional area of the element reduces gradually from bottom to top or from an out-in flow of gas in which the cross-sectional area of the element increases gradually from bottom to top, either of which minimizes flow turbulence which in turn minimizes pressure drop.

It is a still further feature and advantage of the present invention to provide an oil or fluid separator element for separating liquid or oil from a gas flow having a curved side which enables flexibility in separator tank design by assuring sufficient gas collection space outside the element, eliminates the possibility of local throttling areas, and maximizes separation efficiency.

It is an additional feature and advantage of the present invention to provide an oil or fluid separator element for separating liquid or oil from a gas flow having a curved side which can be used for any liquid/gas separation and for spin-on or cartridge style separators.

It is another feature and advantage of the present invention to provide an oil or fluid separator element for separating liquid or oil from a gas flow having a curved side which can be used for any single or multi-element application.

It is also a feature and advantage of the present invention to provide an oil or fluid separator element for separating liquid or oil from a gas flow having a curved side which can be used in a separator having a laterally disposed outlet port without the separation performance loss due to throttling of the outlet port area that is typically experienced in attempting to use conical or cylindrical elements in such separators.

To achieve the stated and other features, advantages and objects, the curved side oil or fluid separator element for separating liquid or oil from a gas flow for an embodiment of the present invention has a body portion consisting wholly, or at least partly, of filter media and is mountable in a separator housing. The body portion of the separator element has opposing upper and lower ends and a curved side that extends between its upper and lower ends. The curved side of the body portion can be any one of a hyperbolically curved side, a circular arc curved side, an elliptically curved side, or any other curve except the straight line, or any combinations of the above curves.

Moreover, the curved side of the body portion rotates 360° about a central axis of the body portion to form a curved surface of the body portion. The body portion of the separator element has a cross-sectional area perpendicular to its central axis that in one embodiment is greater at its lower end than at its upper end and decreases gradually at a gradually decreasing rate from its lower end to its upper end. In another embodiment, the cross-sectional area of the body portion is greater at its upper end than at its lower end and increases gradually at a gradually increasing rate from its lower end to its upper end. The outlet can be located farthest away from each end without resulting in any throttling in the outlet port region.

In one aspect, one of the upper and lower ends of the separator element body portion defines an inlet for receiving the gas flow from a communicating inlet of the separator housing, and the curved side of the body portion is adapted for in-out gas flow allowing the gas flow received via the inlet to exit through the curved side to a communicating outlet of the separator housing. In another aspect, one of the upper and lower ends of the separator element body portion defines an outlet for allowing the gas flow to exit to a communicating outlet of the separator housing, and the curved side of the body portion is adapted for out-in gas flow for receiving the gas flow through the curved side from a communicating inlet of the separator housing.

An embodiment of the invention also provides a separator system for separating liquid from a gas flow that employs a plurality of separator elements, each of which likewise has a body portion consisting wholly or partly of filter media with opposing upper and lower ends and a curved side extending between the opposite ends, the curved side of each of which likewise rotates 360° about a central axis of the body portion to form a curved surface of the body portion. One of the upper and lower ends of each separator element forms an inlet for receiving the gas flow from a communicating inlet of the separator housing, and the curved side of each separator element is adapted for in-out gas flow allowing the gas flow received via the inlet to exit through the curved side to a communicating outlet of the separator housing.

In another aspect, a separator system for separating liquid from a gas flow likewise employs a separator housing having an inlet for receiving the gas flow and an outlet for allowing the gas flow to exit, within which one or more separator elements are disposed. The separator element likewise has a body portion consisting wholly or partly of filter media and opposite upper and lower ends and a curved side extending between its upper and lower ends, which rotates 360° about a central axis of the body portion to form a curved surface of the body portion. In this aspect, the separator housing has its outlet spaced between its own upper and lower ends.

Additional objects, advantages and novel features of the invention will be set forth in part in the description which follows, and in part will become more apparent to those skilled in the art upon examination of the following, or may be learned from practice of the invention.

DETAILED DESCRIPTION

Referring now in detail to an embodiment of the present invention, an example of which is illustrated in the accompanying drawings, the present invention provides an oil or fluid separator element with a curved side that is used to separate liquid or oil from a gas flow, such as air, refrigerant or any other gas and that can be used for any liquid/gas separation. The separator element for an embodiment of the invention can be manufactured using manufacturing techniques and component materials similar to those employed in the manufacture of existing art cylindrical of conical filter elements and may include, for example, flanges, gaskets, caps, and pleated filer media designs. Further, the separator element having the curved side for an embodiment of the invention can be used, for example, for spin-on or cartridge style separators, for any single or multi-element applications, and/or for in-out flow or out-in flow.

Figure 1:
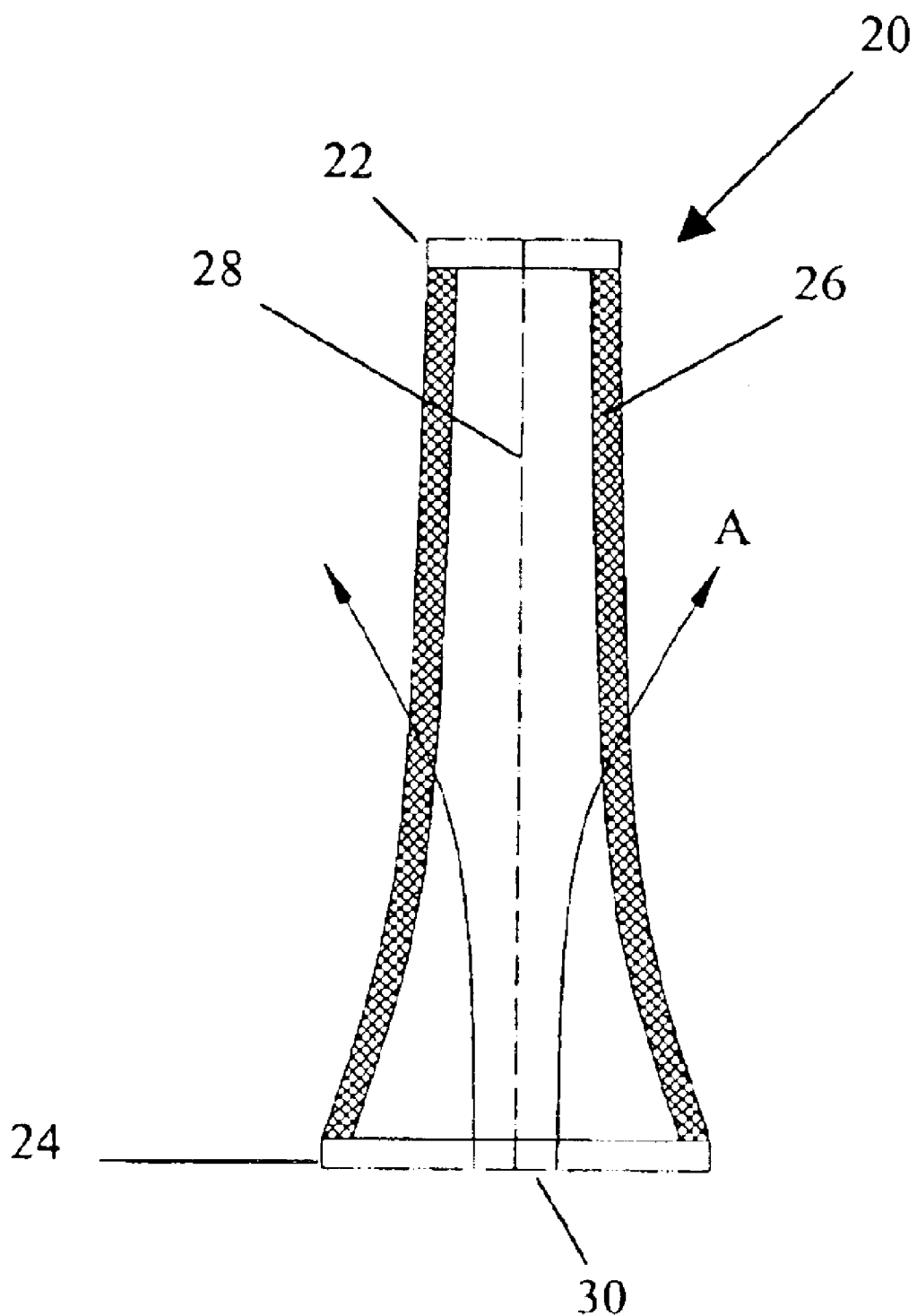
FIG. 1 is a schematic cross-sectional view of an example of the oil or fluid separator element having a curved side for in-out flow of gas for an embodiment of the present invention.

FIG. 1 shows a schematic cross-sectional view of an example of the oil or fluid separator element 20 for an embodiment of the invention, which is mountable, for example, in a generally cylindrical separator tank (not shown), and which has upper and lower ends 22 and 24 and a curved side 26 (a cross-sectional view of which is depicted in FIG. 1) for in-out flow of gas in arrow direction A. Referring to FIG. 1, the curved side 26 of the separator element 20 rotates 360° about the central axis 28 of the separator element to form the curved surface of the separator element.

A key feature of an embodiment of the invention is that side 26 of the separator element 20 is curved rather than straight, and the curvature can take the form of any curve, such as a hyperbola, part of a circular arc, part of an ellipse, or the like, or any of their combinations. Referring further to FIG. 1, the separator element 20 has an inlet 30 at its lower end 24 that is in communication, for example, with the inlet of a separator tank when the separator element is mounted in the separator tank (not shown). Gas enters the separator element 20 through inlet 30 of the separator element and travels upwardly and exits the separator element through curved side 26 in arrow direction A and in turn exits the separator tank, for example, through an outlet of the separator tank in communication with curved side 26.

Figure 2:
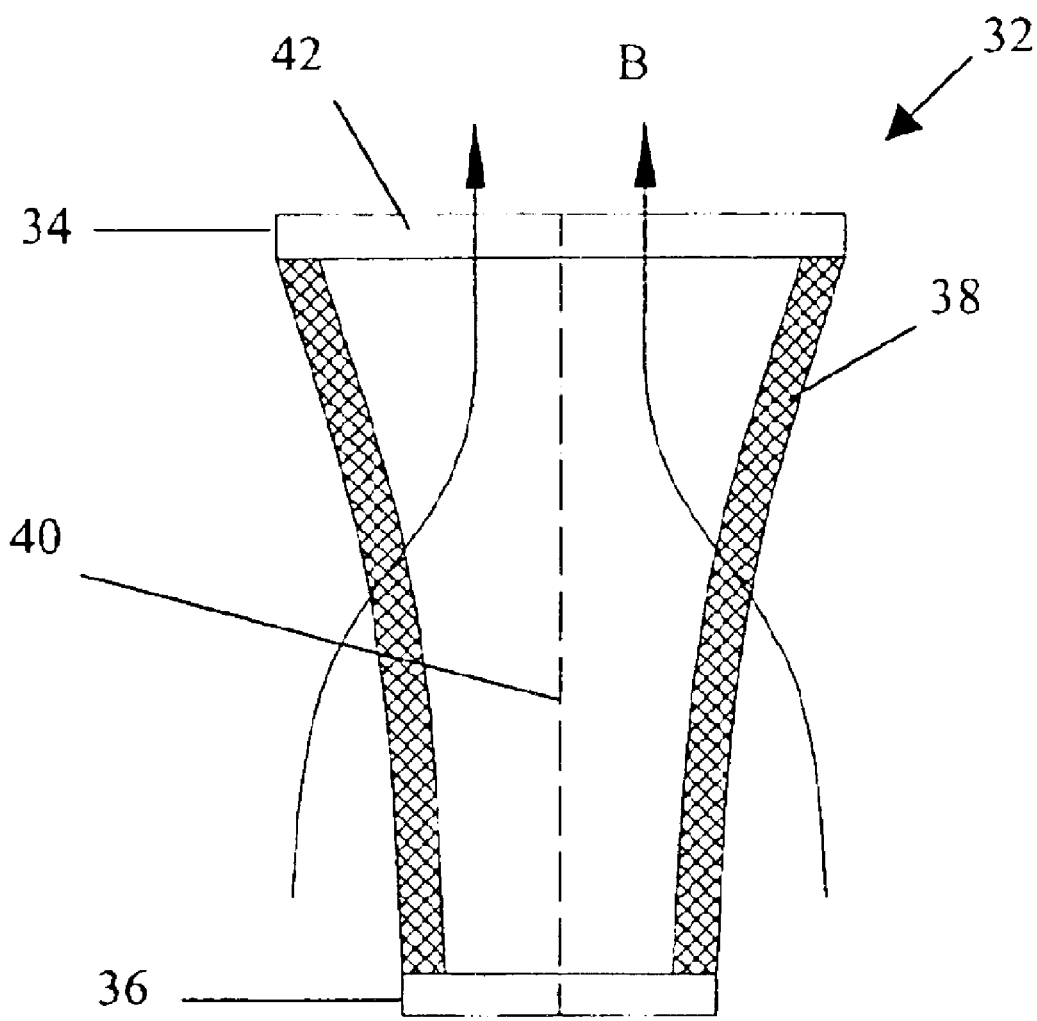
FIG. 2 is a schematic cross-sectional view of an example of the oil or fluid separator element having a curved side for out-in flow of gas for an embodiment of the present invention.

FIG. 2 shows a schematic cross-sectional view of another example of an oil or fluid separator element 32 for an embodiment of the invention with upper and lower ends 34 and 36 and a curved side 38 (a cross-sectional view of which is depicted in FIG. 2) for out-in flow of gas in arrow direction B, which is similarly mountable in a separator tank (not shown). Referring to FIG. 2, the curved side 38 of the separator element 32 likewise rotates 360° about the central axis 40 of the separator element to form the curved surface of the separator element, and the curvature can likewise take the form of any curve, such as a hyperbola, part of a circular arc, part of an ellipse, or the like, or any of their combinations.

Referring further to FIG. 2, the curved side 38 of separator element 32 is in communication with an inlet of a separator tank when the separator element is mounted in the separator tank (not shown). Gas enters the separator element 32 through curved side 38 of the separator element and travels upwardly and exits the separator element through outlet 42 in arrow direction B and in turn exits the separator tank, for example, through an outlet of the separator tank in communication with separator element 32.

It is inherent from the nature of the curvature, such as a hyperbolic curvature, of the curved side 26 of separator element 20 as shown in FIG. 1 and the curved side 38 of separator element 32 as shown in FIG. 2, that each of curved sides 26 and 38 provides a greater surface area than provided, for example, by existing art straight-sided conical separator elements using the same amount of filter media material. Moreover, the increased surface area of curved sides 26 and 38 enables a lower gas flow velocity that results in the highest separation efficiency. Further, as can be seen in FIGS. 1 and 2, filter elements 20 and 32 both have smooth nozzle-like shapes which provide superior flow distribution.

Any element like that shown in FIG. 2 can also be used for in-out flow. When it is used for either the applications of in-out and out-in flows, the wet band area can be reduced significantly, as the wet band height usually remains the same. A lower wet band area will result in a lower gas velocity across the element, and thus a higher separation efficiency.

As seen in FIG. 1, as the gas flows in arrow direction A from the lower end 24 to the upper end 22 of the filter element 20, the cross sectional area of the filter element perpendicular to its central axis 28 decreases gradually (at a gradually decreasing rate) via the curvature of side 26, and as seen in FIG. 2, as the gas flows in arrow direction B from lower end 36 to upper end 34 of the filter element 32, the cross sectional area of the filter element perpendicular to its central axis 40 increases gradually (at a gradually increasing rate) via the curvature of side 38. The particular configurations of filter elements 20 and 32 results in low flow turbulence and thus low pressure drop both in the in-out flow in arrow direction A as shown in FIG. 1 and in the out-in flow in arrow direction B as shown in FIG. 2.

Embodiments of the invention allow great flexibility in separator tank design by supplying copious gas collection space outside the respective separator elements 20 or 38, as shown in FIGS. 1 and 2, within the separator tank when the separator element is mounted in the separator tank (not shown) and eliminate any possible local throttling areas, so that the highest separation efficiency is achieved. This is especially true, for example, of a multi-element or modular design as shown in FIG. 3, which is a schematic cross-sectional view of an example of the multi-element application of the oil or fluid separator element having a curved side for an embodiment of the present invention.

Figure 3:
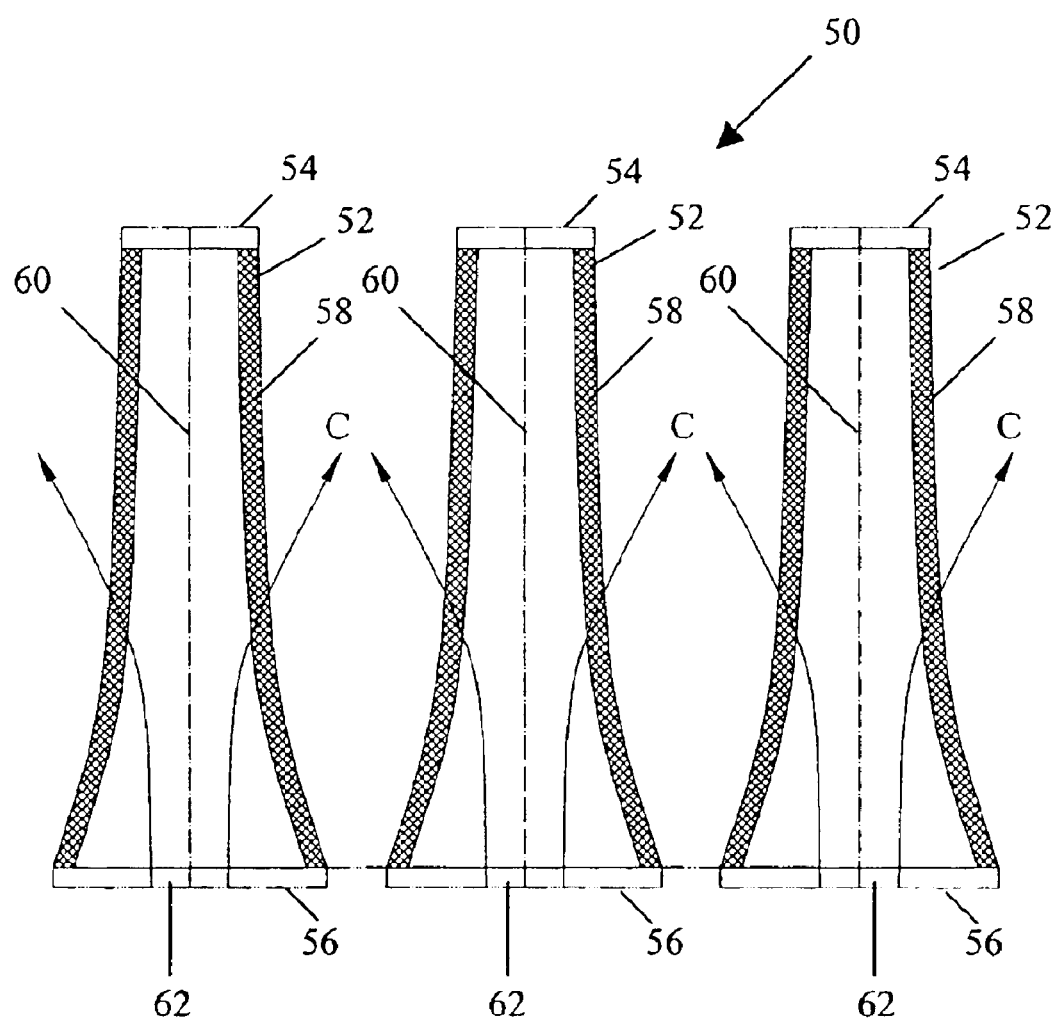
FIG. 3 is a schematic cross-sectional view of an example of the multi-element application of the oil or fluid separator element having a curved side for an embodiment of the present invention.

Referring to FIG. 3, a plurality of separator elements 52 for an embodiment of the invention, are mountable, for example, in a separator tank (not shown), and each likewise has upper and lower ends 54 and 56 and a curved side 58 (a cross-sectional view for each of which is depicted in FIG. 3) for in-out flow of gas in arrow direction C. Referring to FIG. 3, the curved side 58 of each of the plurality of separator elements 52 likewise rotates 360° about the central axis 60 of the separator element to form the curved surface of the separator element.

Referring further to FIG. 3, each separator element 52 has an inlet 62 at its lower end 56 that is in communication, for example, with one or more inlets of the separator tank when the respective separator elements 52 are mounted in the separator tank (not shown). Gas enters each separator element 52 through inlet 62 of the separator element and travels upwardly and exits the separator element through curved side 58 in arrow direction C and in turn exits the separator tank, for example, through an outlet of the separator tank in communication with curved side 58.

It is to be noted that each one of the plurality of separator elements 52 depicted in FIG. 3 is substantially similar to, and functions in substantially the same way as, the individual separator element 20 shown in FIG. 1, the principal difference being the utilization of multiple separator elements in a separator tank that is designed and configured to accommodate the particular arrangement of separator elements. It is to be further noted that a plurality of the individual separator elements 32 shown in FIG. 2 for out-in flow of gas can be substituted in place of the plurality of separator elements 52 depicted in FIG. 3.

Referring further to FIG. 3, it is readily apparent that severe separation performance loss due to throttling of the narrow space between elements will result from any attempt to use existing art cylindrical or conical separator element in a separator tank. On the other hand, it is equally readily apparent that embodiments of the invention eliminate any local throttling areas and provide copious gas collection space outside the separator element 58, so that the highest separation efficiency is achieved.

Figure 4:
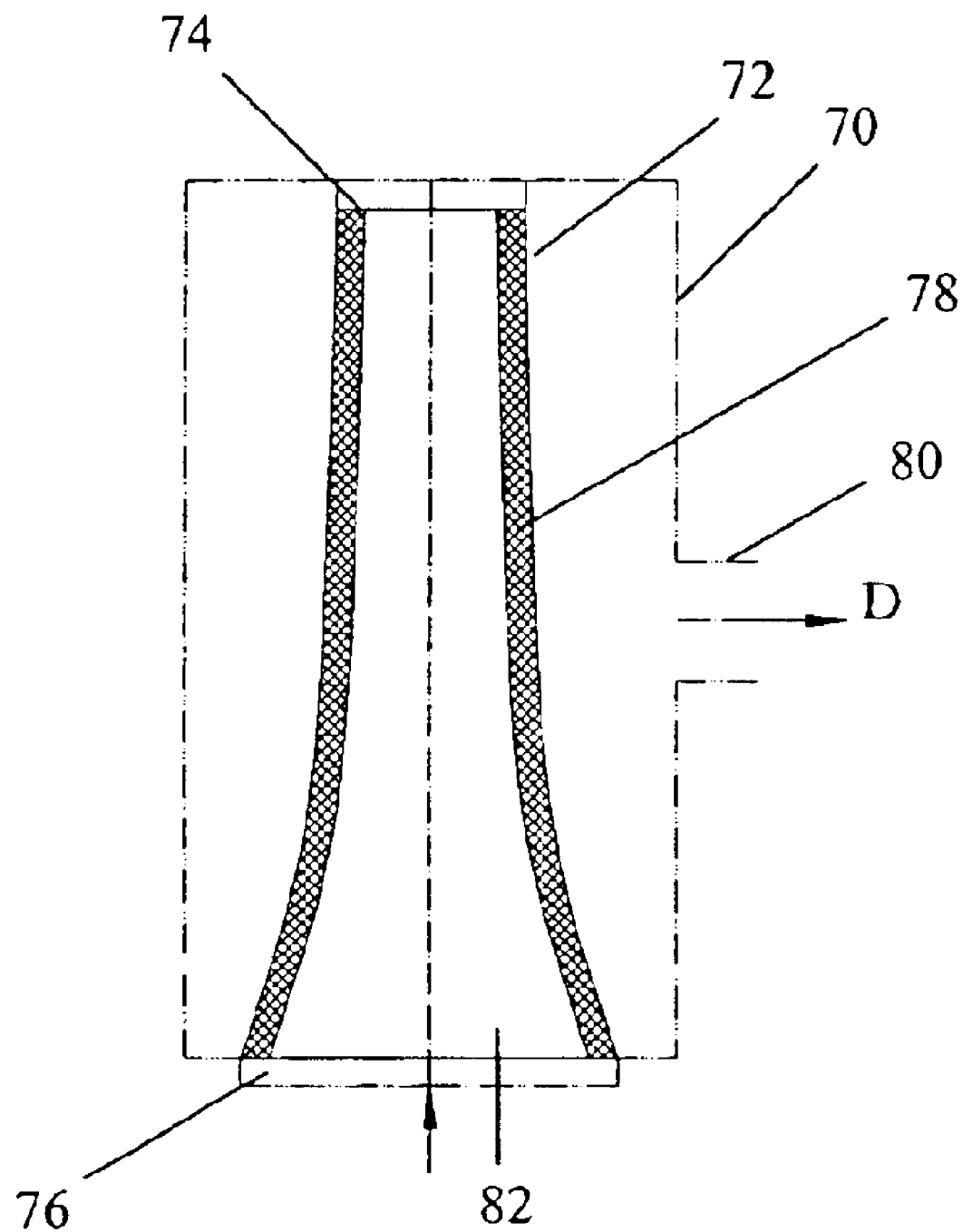
FIG. 4 is a schematic cross-sectional view of an example of the oil or fluid separator element having a curved side as used in a separator having a laterally disposed outlet port for an embodiment of the present invention.

FIG. 4 is a schematic cross-sectional view of an example of a separator tank 70 in which the oil or fluid separator element 72 having upper and lower ends 74 and 76 and a curved side 78 for an embodiment of the invention is installed. The separator tank 70 has a laterally disposed outlet port 80. Referring to FIG. 4, gas enters the separator element 72 through an inlet 82 at the bottom and travels upwardly and exits through curved side 78 of the separator element and in turn exits the filter tank 70 through lateral outlet 80 in arrow direction D.

Referring further to FIG. 4, it is readily apparent that severe separation performance loss due to throttling of the outlet port area will result from any attempt to use existing art cylindrical or conical separator element in a separator tank having its outlet port located in the laterally disposed position depicted in FIG. 4. On the other hand, it is equally readily apparent that embodiments of the invention eliminate any local throttling areas and provide copious gas collection space outside the separator element 72 within the separator tank 70, so that the highest separation efficiency is achieved.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. One of these examples is in-out flow in FIG. 2.

What is claimed is:

1. A separator element for separating liquid from a gas flow, comprising: a body portion consisting at least in part of filter media mountable in a separator housing and having opposing upper and lower ends and a curved side extending between the opposing ends, wherein the curved side rotates 360° about a central axis of the body portion to form a curved surface of the body portion, and wherein one of the upper and lower ends further comprises an inlet for receiving the gas flow from a communicating inlet of the separator housing.

2. The separator element of claim 1, wherein the curved side further comprises one of a hyperbolically curved side, a circular arc curved side, and an elliptically curved side.

3. The separator element of claim 1, wherein the curved side comprises a hyperbolically curved side.

4. The separator element of claim 1, wherein the curved side comprises a circular arc curved side.

5. The separator element of claim 1, wherein the curved side comprises an elliptically curved side.

6. The separator element of claim 1, wherein the curved side is adapted for in-out gas flow allowing the gas flow received via the inlet to exit through the curved side to a communicating outlet of the separator housing.

7. The separator element of claim 1, wherein one of the upper and lower ends further comprises an outlet for allowing the gas flow to exit to a communicating outlet of the separator housing.

8. The separator element of claim 7, wherein the curved side is adapted for out-in gas flow for receiving the gas flow through the curved side from a communicating inlet of the separator housing.

9. The separator element of claim 1, wherein the body portion has a cross-sectional area perpendicular to its central axis that is greater at its lower end than at its upper end and decreases gradually at a gradually decreasing rate from its lower end to its upper end.

10. The separator element of claim 1, wherein the body portion has a cross-sectional area perpendicular to its central axis that is greater at its upper end than at its lower end and increases gradually at a gradually increasing rate from its lower end to its upper end.

11. The separator element as described in claim 10, which has a reduced wet band area and thus a reduced gas velocity across the element and an increased separation efficiency.

12. The separator element of claim 1, wherein the curved side is non-linear and comprises a combination of curves.

13. A separator system for separating liquid from a gas flow, comprising: a plurality of separator elements, each having a body portion consisting at least in part of filter media mountable in a separator housing and having opposing upper and lower ends and a curved side extending between the opposing ends, wherein the curved side of each rotates 360.degree. about a central axis of the body portion to form a curved surface of the body portion, wherein one of the upper and lower ends of each separator element further comprises an inlet for receiving the gas flow from a communicating inlet of the separator housing.

14. The separator system of claim 13, wherein the curved side of each separator element is adapted for in-out or out-in gas flow allowing the gas flow received via the inlet to exit through the curved side to a communicating outlet of the separator housing.

15. A separator system for separating liquid from a gas flow, comprising: a separator housing having an inlet for receiving the gas flow and an outlet for allowing the gas flow to exit; at least one separator element disposed within the separator housing having a body portion consisting at least in part of filter media and having opposing upper and lower ends and a curved side extending between the opposing ends, wherein the curved side rotates 360° about a central axis of the body portion to form a curved surface of the body portion, wherein the separator housing has opposing upper and lower ends, and the separator housing outlet is spaced between its upper and lower ends, and spaced away from the upper and lower ends without throttling loss at an outlet port region.

* * * * *